(12) United States Patent
Kearney et al.

(10) Patent No.: US 7,793,826 B2
(45) Date of Patent: Sep. 14, 2010

(54) CONTROLLING TRANSACTIONS

(75) Inventors: Paul J Kearney, Felixstowe (GB);
Simon P Griffiths, Ipswich (GB);
Robert J Glassford, Ipswich (GB)

(73) Assignee: British Telecommunications public limited company, London (GB)

( * ) Notice: Subject to any disclaimer, the term of this patent is extended or adjusted under 35 U.S.C. 154(b) by 1042 days.

(21) Appl. No.: 10/592,088

(22) PCT Filed: Mar. 7, 2005

(86) PCT No.: PCT/GB2005/000883

§ 371 (c)(1),
(2), (4) Date: Sep. 7, 2006

(87) PCT Pub. No.: WO2005/088495

PCT Pub. Date: Sep. 22, 2005

(65) Prior Publication Data
US 2007/0187481 A1    Aug. 16, 2007

(30) Foreign Application Priority Data
Mar. 12, 2004    (GB)    ................................. 0405623.0

(51) Int. Cl.
*G07F 19/00*    (2006.01)
(52) U.S. Cl. ..................................................... 235/379
(58) Field of Classification Search ................. 235/379, 235/375; 705/35, 41
See application file for complete search history.

(56) References Cited
U.S. PATENT DOCUMENTS
4,817,114 A    3/1989    Boer et al.
(Continued)

FOREIGN PATENT DOCUMENTS
EP    0169548    7/1985
(Continued)

OTHER PUBLICATIONS
International Search Report dated May 24, 2005.
(Continued)

*Primary Examiner*—Seung H Lee
(74) *Attorney, Agent, or Firm*—Nixon & Vanderhye P.C.

(57) ABSTRACT

Before a transaction takes place between a plurality of agent-based devices (21-29), not all of which have previous experience of each other, a data file is created which identifies all the agents which are to take part in the transaction. The data file is circulated to all the agents, and each agent endorses the data file in respect of each other agent with a positive, negative, or conditional endorsement, based on stored data indicating whether that agent is capable of co-operation with the other agent. A negative endorsement is applied by an agent in respect of any agent with which it is not prepared to co-operate. Such a negative endorsement is fatal to the transaction. A positive endorsement is applied by an agent (21) in respect of any other agent (27) with which it is unconditionally prepared to co-operate. A conditional endorsement by a first agent (21) of a second agent (23) is applied where the first agent (21) has insufficient data to apply either a positive or negative endorsement, and expresses conditions which would allow the endorsement to be made positive—for example positive endorsement by some other specified agent (28). If these conditions are subsequently satisfied, the endorsement is amended to positive. When all agents (29) have endorsed the data file, if all the resulting endorsements are positive a successful validation is reported to the originating agent (20), allowing the transaction to proceed.

13 Claims, 7 Drawing Sheets

U.S. PATENT DOCUMENTS

| | | | |
|---|---|---|---|
| 6,148,290 | A | 11/2000 | Dan et al. |
| 6,658,242 | B1 | 12/2003 | Knutson et al. |
| 6,848,613 | B2 * | 2/2005 | Nielsen et al. ............. 235/379 |
| 7,246,740 | B2 * | 7/2007 | Swift et al. ................. 235/379 |
| 7,403,922 | B1 * | 7/2008 | Lewis et al. .................... 705/38 |
| 2002/0062322 | A1 | 5/2002 | Genghini et al. |
| 2002/0071149 | A1 | 6/2002 | Xu et al. |
| 2002/0144122 | A1 | 10/2002 | Haughan et al. |
| 2003/0028585 | A1 | 2/2003 | Yeager et al. |

FOREIGN PATENT DOCUMENTS

| | | |
|---|---|---|
| EP | 0996261 A2 | 4/2000 |
| EP | 1006469 A | 6/2000 |
| EP | 1296268 A1 | 3/2003 |
| EP | 1308871 A2 | 5/2003 |
| GB | 1450438 | 9/1976 |
| WO | WO 00/77974 A | 12/2000 |
| WO | WO 01/95136 A | 12/2001 |
| WO | WO 02/21347 A1 | 3/2002 |
| WO | WO 02/25400 A2 | 3/2002 |

OTHER PUBLICATIONS

UK Search Report dated May 24, 2004.
Skevington et al., "Trusted Third Parties in Electronic Commerce", BT Technology Journal, BT Laboratories, GB, vol. 15, No. 2, Apr. 1, 1997, pp. 39-44, XP000703555.
GB Search Report dated Feb. 22, 2005.

* cited by examiner

Figure 5

| www.compactterms.xxx 58 | | | | |
|---|---|---|---|---|
| All to approve 59 | 509 | 519 | 529 | |
| PRIN 20 | 50 / 26 | | | |
| PRIN 21 | 51 / 27 | ? 27 | | |
| ........ | | | | |
| TSP 26 | | | 56 / 20,27 | |
| TSP 27 | 21, 22, 26, 28 | | + | 57 |
| ........ | | | | |

CONTROLLING TRANSACTIONS

This application is the US national phase of international application PCT/GB2005/000883 filed 7 Mar. 2005 which designated the U.S. and claims benefit of GB 0405623.0, dated 12 Mar. 2004, the entire content of which is hereby incorporated by reference.

BACKGROUND

1. Technical Field

This invention relates to a device and process for establishing the basis for an electronic or other machine-based transaction between two or more processing devices in an open distributed system each acting on behalf of a party to the transaction, and in particular a distributed protocol for establishing the basis of an agreement between users of such devices, to co-operate to provide a service or engage in an electronic transaction.

2. Description of Related Art

Any transaction requires an element of trust between the participants. The notion of trust can be formalised along the following lines. Suppose we have a situation in which one party (B) has offered some commitment to another party (A), possibly in return for some reciprocal commitment. Party A cannot be certain that B will complete its commitment. If party A accepts the offer from B, it will subsequently act on the assumption that B will complete its commitment—for example by providing a service to B in the expectation that B will pay for it or, conversely, by paying B in advance for a service B is expected to provide. Should B fail to do so, then A may suffer some loss.

As a rational agent, A will only accept B's offer if it perceives the risks to be outweighed by the probable benefits, where 'risk' takes into account the probability of B failing to deliver and the cost to A of this eventuality. If A accepts, then it can be said to "trust" B in the context of this transaction. The degree of perceived risk involved is a measure of the amount of trust A is placing in B.

'Real life' business-business transactions typically take place between companies with long-standing trading relationships involving trust and mutual-dependence. In ebusiness over the Internet, it is much more difficult to be sure of the identity and trustworthiness of a potential partner in a transaction. One widely used approach to overcome lack of trust is the 'trusted third party' (TTP). A TTP is a mutually-trusted and impartial intermediary.

When conducting transactions electronically, for example over an open distributed system such as the "Internet", there are a number of particular problems that arise in establishing trust. In particular it is quite possible that the parties will have had little or no prior contact or knowledge of reputation or brand. For example, one party may have found the other using found B via an on-line directory of some sort. It is also relatively difficult to confirm the identity of the other party. For example one of the parties may be disguising itself as a more reputable party.

This situation is made worse when one considers multi-party transactions, which are becoming increasingly common. For example, the service to be provided may be a composite one, provided by integrating simpler services, each of which may be provided by different principals. For example a skiing holiday package may require airline tickets, transfers to and from the airport, currency exchange, accommodation, and facilities at the destination such as equipment and instruction. It is quite possible that the failure of any one provider to deliver on its commitments might destroy any value of the remainder of the service to the end user. However, the other service providers may have expended resources delivering their service components before the antisocial behaviour is discovered. The question of liability can thus be quite complex. The trustworthiness of this consortium or Virtual Organisation will depend not only on that of the individual providers, but also on their ability to work together effectively.

A 'contract net' approach in which the virtual organisation is formed as a collection of coupled binary 'customer-provider' relationships can simplify liability, but it raises other questions. Suppose a travel agent is acting as a broker or prime contractor for a service that combines contributions from a number of other service providers. If the customer's dealings are exclusively with the travel agent, he may not even be aware that the other providers are being used. Furthermore, the travel agent may be putting the consortium together 'on-the-fly', selecting which service providers to use on a case-by-case basis. The customer's experience from past dealings with the agent may then be of limited predictive value.

FIG. 1 shows a scenario involving a traveler with a laptop computer or personal digital assistant (PDA) 10 visiting a wireless local area network (WLAN) hot spot 11. At present, such hot spots are affiliated with particular providers, and the traveler would have to be a subscriber to the provider's service, or pay on the spot, to use the facilities. However, it is envisaged that in future a traveller's subscription may be with a Roaming Service Provider (RSP) 12. The RSP is a virtual operator, which does not own hotspots, but offers its subscribers access via any hotspot that the user wishes to use, with a suitable agreement being negotiated in real time with the operator 13 of the hotspot 11 if the RSP 12 does not already have an existing relationship with the hotspot operator 13. Having made a connection, the traveller 10 can then use the Internet 14 to access a multi-media cultural briefing (including high quality video), which is customised to his individual tastes and to the location of the hotspot 11. The video may be streamed to a high resolution screen in a booth in the hotspot.

This scenario involves delivery of a composite service on several levels. Firstly, the actual content may combine material from different sources. Tailoring the content requires information on the locale (e.g. from the hotspot operator 13) and on the end-user (which may be held on the user's equipment 10 or by the RSP 12). The communications channel delivering the service crosses multiple networks potentially owned by different operators some of which may be relatively small (e.g. the hotspot operator), and some may be 'virtual'. This raises the prospect that agreements between operators may need to be reached in real time, not only at a service management level, but at a business level as well. Arrangements for accounting, billing and revenue distribution need to be worked out, and the associated tasks (including co-ordination) shared among the parties involved.

In such a situation, it is necessary for each party to be able to trust the others. If one party has direct experience of another, and considers it to be reliable, a trust bond may be said to exist between them. In a device acting as agent for one party, this trust bond may be embodied as a data entity relating to the other party. Negative trust bonds may exist, in which one party has experience that the other is not trustworthy. These can be recorded in the same way. However, in many cases the users will have no previous experience of each other, and no trust bond (positive or negative) will exist. Note that a trust bond is unidirectional. For example, an individual user may trust a large company, but the converse need not be true. However, no transaction will operate unless each party trusts the other.

One way to facilitate a trust relationship between parties is to introduce a trusted third party (TTP), as shown in FIG. 2. This is an entity 29 that is trusted by one or more of the parties 21,22 taking part in the transaction (hereinafter referred to as "principals"). The participation of the TTP 29 in a transaction enables any principals 21,22 with which it has a pre-existing trust bond to behave as if a trust bond exists between them. In this specification the term "trust service provider" (TSP), to denote a TTP providing an electronic service that effectively strengthens trust in this way.

A TSP may operate in a number of ways. It may provide an authentication service between principals who do not initially have any knowledge of each other. The principals may be unwilling to provide each other with the credentials that would support their identity claims, since this would expose them to risk that the other party might copy these credentials and use then fraudulently. Instead, one party supplies the credentials to the TSP, which checks the identity and confirms it to the other party. The accredited party must trust the TSP not to misuse or reveal the credentials, while the other party must trust it to be competent as regards authentication checks and also truthful.

Another possible function of a TSP is as an electronic "notary", acting as a trusted witness to contracts or transactions. If disagreement arises (e.g. over whether or when an agreement was entered into), a document signed by the notary can be produced by one of the parties, providing authoritative evidence.

A TSP may also act as an intermediary in transactions (e.g. purchases) between parties who do not trust each other. The parties send the money and item to a TSP, and when both have been delivered to the TSP, it releases them both. Both parties A and B must trust the TSP not to run off with the money or item to be purchased, and to release them when and only when the requirements of the contract are satisfied.

It is possible for multiple TSPs to be involved in a transaction, perhaps because different TSPs are providing different services (e.g. identity provider and exchange intermediary), or because different TSPs are acting for different principals. In particular, it may not be possible to identify a single TSP that is acceptable to both parties. However, each party may able to identify a different TSP which it trusts, and which trust each other. The TSPs are then able to act in conjunction to provide a 'chain of trust' between principals. FIG. 3 shows such a situation, in which the principals 21, 22 each have an established trust relationship with a respective TSP 28, 29. In the figure, the TSP are labelled as 'aggregated' (ATSPs), indicating that they each combine multiple TSP roles. This aggregation could be achieved via a unitary multifunction TSP or by a consortium of more specialised TSPs.

It can be seen from FIG. 3 that TSPs can also provide trust services to other TSPs. For example, the first TSP 28 provides a trust service to the second TSP 29 in respect of the principal 21. More generally, if two TSP's have no trust record of each other, but each trusts a third TSP, that third TSP can then bridge the 'trust gap' enabling the other two to proceed confidently with the transaction.

Reliance on a previously-established "circle of trust", or identification of some mutually-trusted impartial third party, is not always possible. The present invention is a technical implementation of a different approach, in which each principal to be represented by a different trusted party in the manner of solicitors representing the different parties in a legal action or house purchase. If we generalise this to complex, multi-party transactions or collaborative business processes, we find a potential requirement for multiple trust service providers playing different specialist roles and affiliated with different principals. Effectively, the TSPs act as a federated TTP. Principals have an established relationship with one or more TSPs, which means they depend on the TSP in question to safeguard their interests in the transaction— e.g. protecting privacy and making sure they are not defrauded. TSPs are expected to be able to recognise the status of other TSPs, for example through certification by a recognised 'meta-TSP', in the same way that solicitors recognise the status and trust the professional conduct of fellow solicitors. This concept of federations of TSPs is a generalisation of the federation concepts underlying federated identity management schemes such as defined by Project Liberty/the Liberty Alliance, which talks about circles of trust.

The present invention concerns a mechanism by means of which a group of devices attempting to engage in a potentially complex, multi-party transaction can reach and record agreement on a set of trust service providers whose participation in the transaction would give the principals sufficient confidence to proceed. Such a mechanism is particularly important when the 'consortium' of principals is assembled dynamically for a particular purpose, with little or no human intervention.

FIG. 4 shows a generalisation of the situation shown in FIG. 3 to multi-party transactions and multiple ATSPs. The lower half of the figure shows, schematically, a collection of principals 21, 22, 23, 24, 25 co-operating to enact a process in order to provide a service to some end user 20 (also a principal). The dotted arrows represent services provided by one principal to another as part of the transaction, with some form of payment expected in return. However, the principals may have no previous knowledge of each other: for example a holidaymaker 20, travel agent 21, airline 22, transfer operators 23, 24 and insurance company 25 may have had no previous dealings with each other. Let us suppose that a draft service agreement has been negotiated laying down the services to be provided and the payments due in return. In order to finalise the agreement, each principal must decide whether it has sufficient confidence in the behaviour of the other principals to outweigh the perceived risk. The upper half of the diagram shows a collection of ATSPs 26, 27, 28, 29 acting in a federated fashion to decrease the perceived risk and/or increase confidence. In effect, the ATSPs are additional participants in the transaction process. The additional operations do not alter the result of a successful transaction. In FIG. 4 arrows are shown associating ATSPs and principals, indicating that the ATSP represents the principal's interests. That is, the ATSPs offer assurances as that their clients' commitments will be fulfilled and ensure that arrangements are made to safeguard their rights. For example, ATSP 27 acts for principals 21 and 23. FIG. 4 also shows messages 31-39, 41-49 being transmitted between the agents 20-29. These will be described later.

BRIEF SUMMARY OF PRESENT EXAMPLE EMBODIMENTS

According to the invention, there is provided a processing device for co-operation with one or more corresponding devices to control the progress of a transaction, means for receiving data files from other such devices, means for reading endorsements of the received data files applied by other parties, means for re-endorsing such data files in respect of each other party identified therein with a positive, negative, or conditional endorsement, wherein a conditional endorsement in the received data is converted to a positive endorsement if specified conditions are satisfied, means for identifying data files which have been endorsed by all parties identified therein, means for reporting a successful validation if all resulting endorsements are positive, and means for reporting an unsuccessful validation if any of the endorsements are negative, and means for progressing the transaction is the validation is successful, and transmission means for transmitting the data file to devices associated with other parties identified therein.

A distributed set of such devices may then co-operate to control the progress of a transaction by determining whether the proposed transaction complies with the predetermined conditions specified in respect of each of the devices. Some or all of the devices in such a set further comprise means for initiating the process by identifying all the parties to a proposed transaction, means for creating a trust data file which identifies all the parties to the transaction, and means for transmitting the file to one or more of said parties. However, some devices may be provided which do not have these features, but can respond to a process initiated by another device.

According to another aspect, there is provided a pre-validation process for transactions between two or more agents, in which a data file is created which identifies all the agents which are to take part in the transaction, the data file is circulated to all the agents, and each agent endorses the data file in respect of each other agent with a positive, negative, or conditional endorsement, wherein a conditional endorsement between a first agent and a second agent is converted to a positive endorsement if the conditions expressed within it are satisfied, and wherein when all agents have endorsed the data file a successful validation is reported if all resulting endorsements are positive, and an unsuccessful validation is reported if any of the endorsements are negative.

The data file will be referred to hereinafter as a "Trust Compact". It is a document in machine-readable form, typically in electronic form. In particular it lists the participants in the transaction (principals and TSPs) and records their assent as regards the adequacy of the trust arrangements. The Trust Compact is passed around during execution of the process, collecting endorsements (e.g. indicating provisional assent). Thus it plays an important role in recording the state of the protocol execution process.

The process itself is decentralised, consisting of a set of message types, and 'rules of behaviour' defining how an 'agent' (principal, TSP, etc.) responds to stimuli such as receipt of a message.

The conditional endorsements are preferably expressed in terms of the presence or absence of other endorsements in the data file.

The invention therefore provides a device and process for identifying and agreeing a set of Trust Service Providers (TSPs—electronic trusted third parties) required to facilitate an automated, complex, multiparty business transaction or collaborative business process. It provides a means of automating the discovery and agreement of a set of 'third party' trust services as additional parties to a (potentially complex) transaction. The additional trust services collectively provide assurance to the principals of the transaction that their interests will be safeguarded, i.e. they implement mechanisms to protect privacy or anonymity, protect against fraud, etc. Without the invention (or equivalent mechanisms) the additional trust services would have to be negotiated 'off-line' between the participation organisations which would rule out the sort of dynamic ad hoc transactions envisaged for the web-service based business applications of the future.

The way in which the set of TSPs is established is such that all principals can be confident that the transaction or collaborative process may proceed without undue risk to their interests. Previous federated identity or trust schemes assume that circles of trust already exist or that ultimately, trust is underwritten by a root certification authority.

The invention facilitates complex transactions and the execution of collaborative (inter-enterprise) business processes. The advantages apply primarily to the automated highly dynamic business environment of the future, rather than the world of today. Without a mechanism such as described here, automated transactions/collaborations will be restricted to low-value/low risk processes or between parties who are well known to each other.

In one embodiment, each agent, having endorsed the data file, forwards it to another agent that has not yet endorsed the data file, or if no such agents remain, to the agent from which the file originated. In an alternative embodiment, each agent returns a response to the agent from which it received the data file, either immediately or after having in turn forwarded the data file to another agent and having received a response therefrom. In the latter case, an agent may make an endorsement conditional on an endorsement by another agent and then forwards the endorsed data file to be received by the other agent and awaits a response, modifying its own endorsement upon receiving a response carrying the data file endorsed by the other agent.

The invention extends to a device configured to perform its role in this process, specifically, a device for endorsing and forwarding trust compacts such that a distributed set of such devices, each representing a party to a potential transaction, forms a system (or in other words a distributed processor) for rejecting or approving a compact. An approved compact would be the basis for an agreement to proceed with a transaction.

The invention also extends to a computer program comprising a set of instructions to cause a computer to perform the method of the invention, and to a computer program or suite of computer programs for use with one or more computers to provide any of the apparatus of the invention, including computer programs comprising general instructions for causing a processing device to process a data file received from another such device, and also instructions for generating a data file, including identifying the agents to that are required to endorse the file. The invention also extends to the said data file itself, which causes a receiving device to process the data embodied in the data file according to general instructions previously programmed into the receiving device.

As will be understood by those skilled in the art the computer programs used to implement the invention, and the datafiles exchanged between them, can be contained on various transmission and/or storage mediums such as a floppy disc, CD-ROM, or magnetic tape so that the program can be loaded onto one or more general purpose computers or downloaded over a computer network using a suitable carrier readable by a suitable computer input device, such as CD-ROM, optically readable marks, magnetic media, punched card or tape, or on an electromagnetic, acoustic or optical signal carried over a telecommunications network. The instructions carried by the carrier may include general instructions for processing a trust compact received from another device, and may also include the instructions for generating such a trust compact. The invention also extends to carriers carrying the instructions embodied in the trust compact itself, which cause the receiving device to operate according to general instructions previously programmed into that device. The rules of behaviour governing the device will differ slightly depending on whether or not it is the initiating device, (which is typically one of the principals), and may also vary between principals and TSPs. However, the basic protocol is the same in each case.

BRIEF DESCRIPTION OF THE DRAWINGS

An embodiment of the invention will be described, by way of example, with reference to the Figures, in which FIG. 1, which has already been discussed, is a schematic diagram illustrating a scenario in which devices may be required to form a co-operative system.

FIG. 5 illustrates, in tabular form, the data carried in a trust data file exchanged between the parties in performing the invention.

Figure 1:
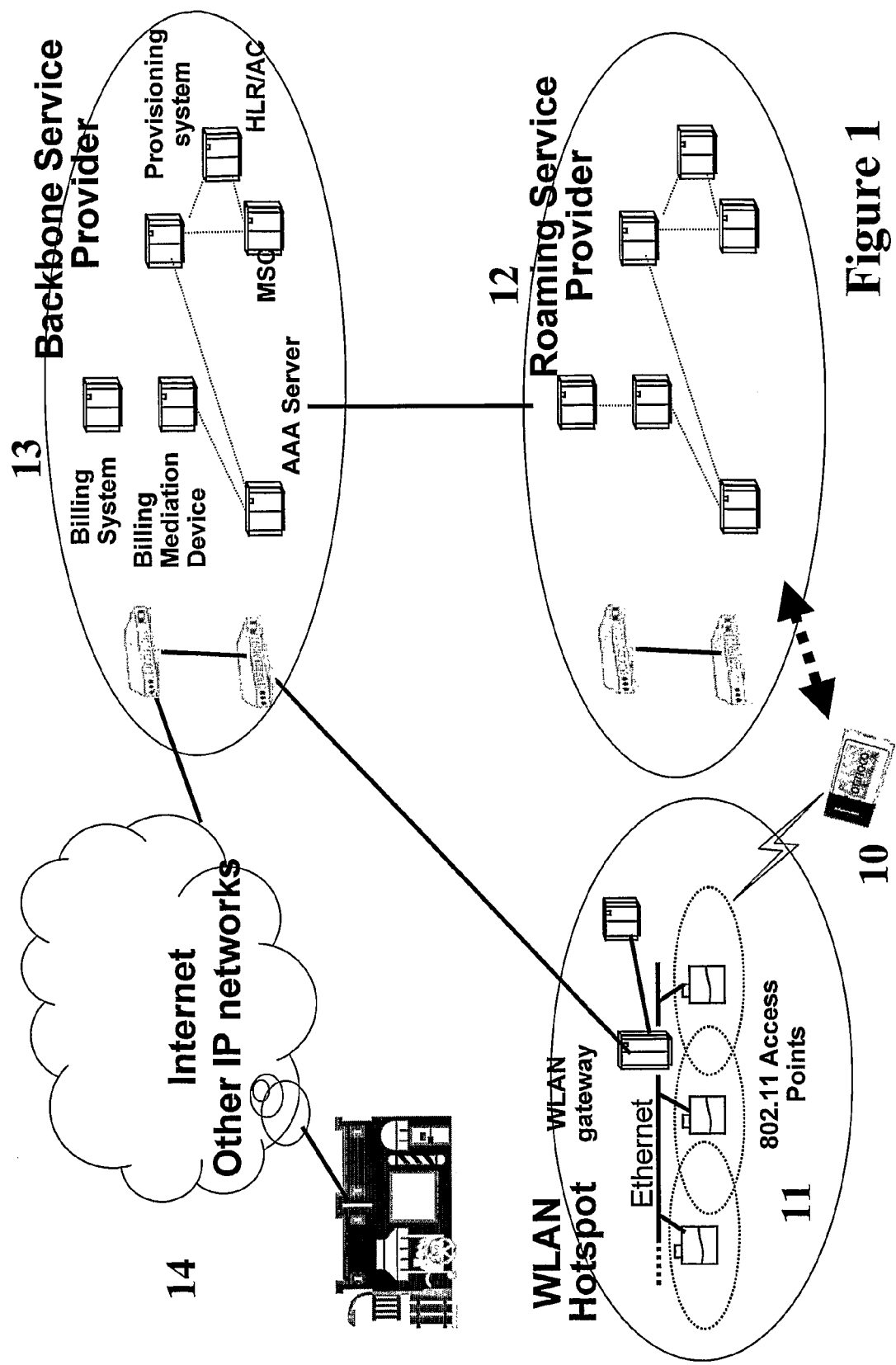
Figure 2:
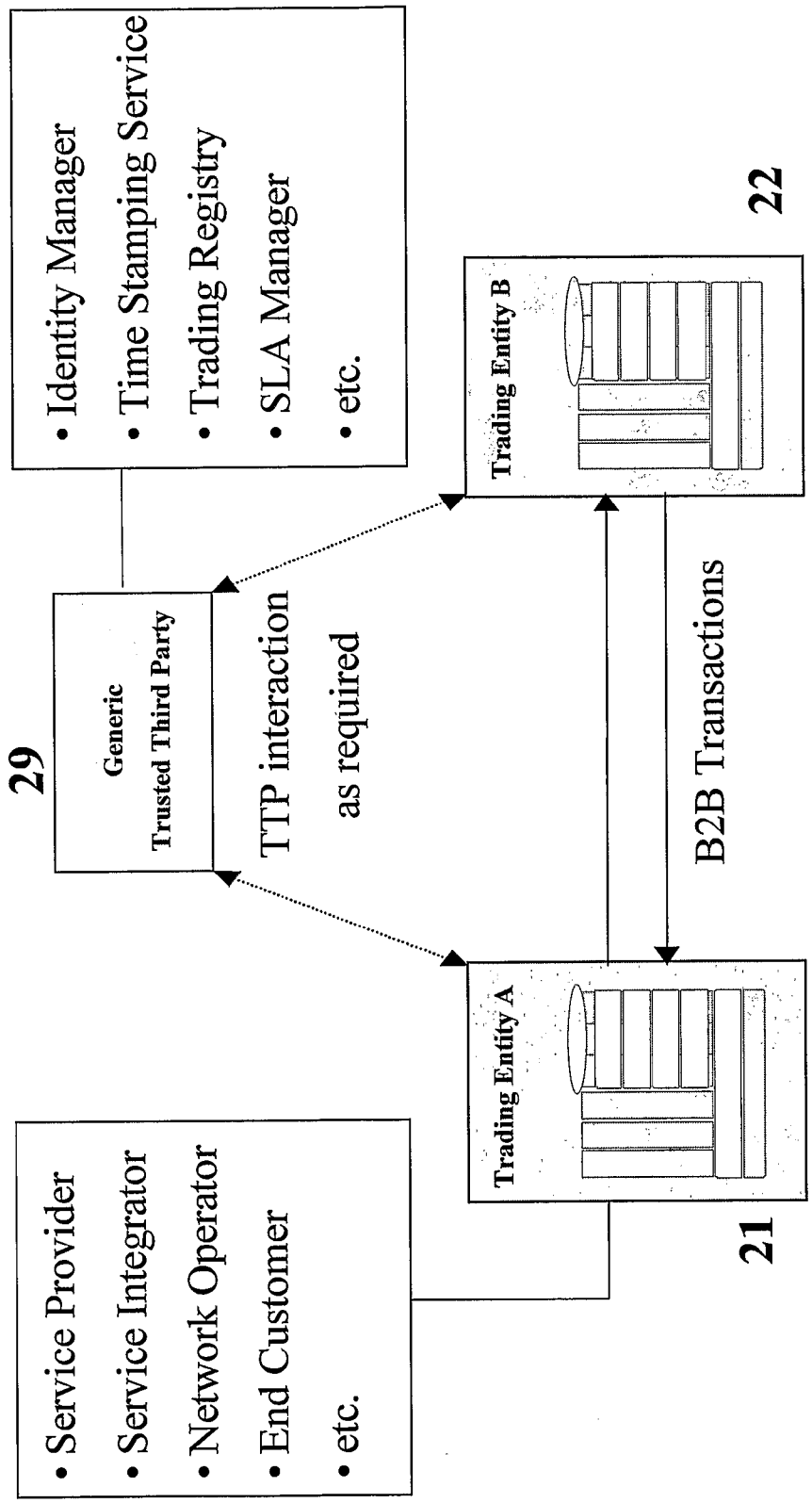
FIG. 2, which has also been discussed, is a schematic diagram illustrating a simple relationship between two principals and a common trust service provider.
Figure 3:
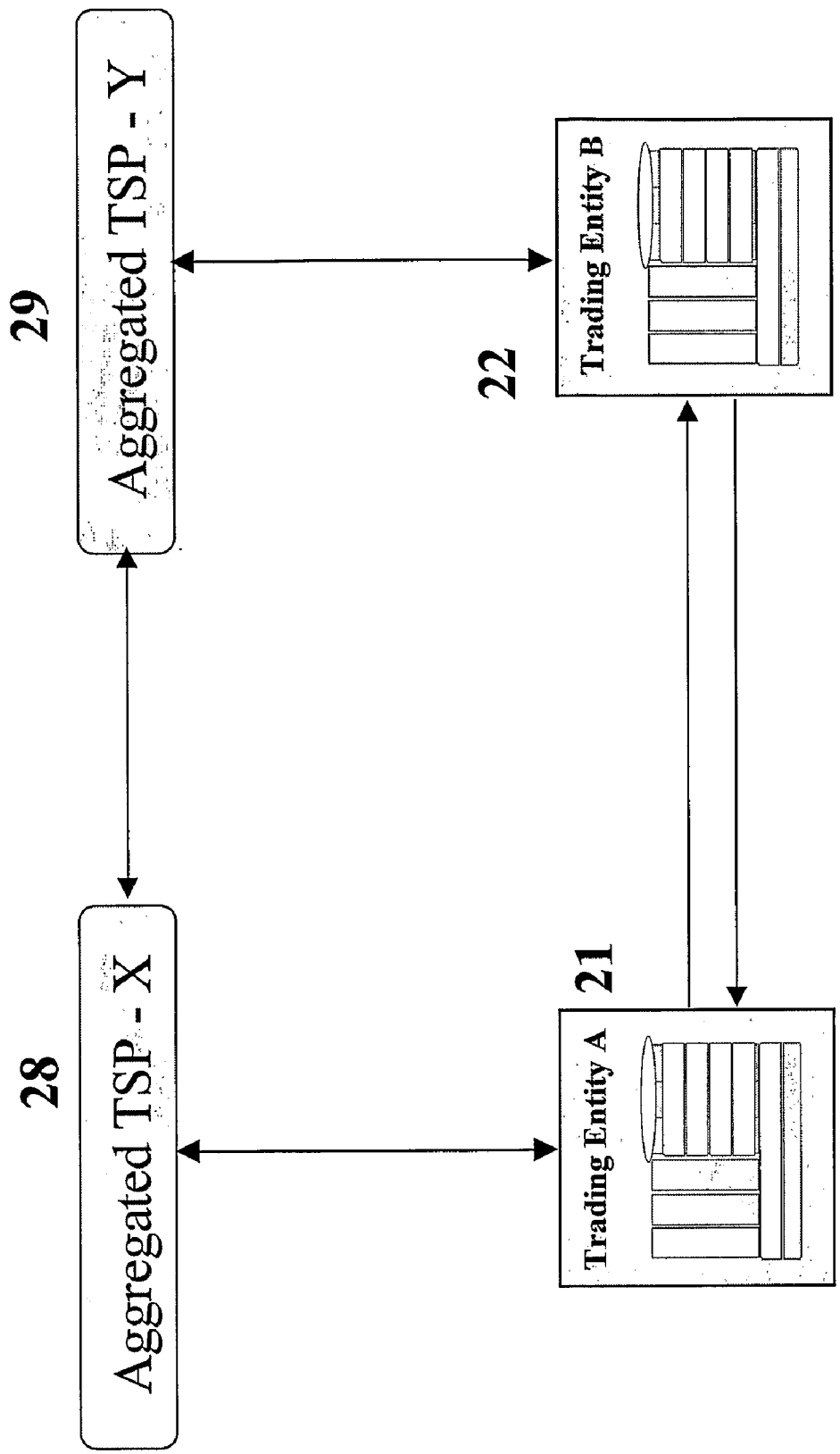
FIG. 3, which has also been discussed, is a schematic diagram illustrating a more complex relationship in which the two principals do not share the same trust service provider.

Many variations on the protocol may be obtained by modifying the rules of behaviour. the versions described should be treated as illustrative examples. Two variant embodiments will be described, in which processing of the endorsed trust compact and the message patterns used to circulate the compact. In both embodiments, the endorsing party will normally select another party and send the modified compact to it.

DETAILED DESCRIPTION OF EXAMPLE EMBODIMENTS

In the first embodiment, there is only one type of message. A message is forwarded from each device to the next until all parties have endorsed it, after which it is forwarded directly back to the initiating party.

In the second embodiment there are two types of message: request and response. Every request sent from an originating party to another party, must be followed by a corresponding response from the other party to the originator. The response indicates whether the responding party accepts or declines the request and also incorporates the updated trust compact. The response need not be sent immediately. In particular, the responding party may send requests to other parties and await their responses before itself responding to the originator.

FIG. 5 shows, in tabular form, the data carried in a typical trust compact file 5 used to mediate the interactions between the agent devices performing the invention. The data set relates to a set of two or more agents 20, 21, 26, 27, that are party to the compact, of which at least two are principals 20, 21. In general, it will also list one or more trust service providers (TSPs) 26, 27. It also includes a set of associations 50, 51, 56, 57 between principals and TSPs. These are represented by a list, for each agent, of the other agents with which it is associated. (The associations represented in FIG. 5 are the same as those illustrated in FIG. 4). An association between a principal 20 and a TSP 26 indicates that the TSP 26 will provide trust services to the principal 20, that is to say it will up-hold the principal's interests in transactions undertaken by the trust chain. The trust compact file 5 also includes a set of endorsements 509, 519, 529, 539 made by the parties to the trust chain (i.e. the principals or TSPs), indicating whether they consent to the trust chain. This set is initially empty, but is filled up as the trust data file is circulated to each party 20, 21, 26, 27. The endorsement may be "positive" (+), negative (−, not shown) or conditional on positive endorsement by some other specified party X (?,X). The file also includes a reference 59 to a draft service agreement document, to provide a context for the decisions to be taken by the parties. The document may be transmitted to each party associated with the file, or a reference to it may be included, such as a reference to a previously circulated document, or (as shown) a "hyperlink" to some mutually accessible location. Finally, the trust data file specifies a completion requirement 59 describing conditions that must be satisfied for the compact to be put into effect. Normally the conditions will be requirements for positive endorsement by some or all parties.

An association indicates the existence of an asymmetric two-way trust relationship. It indicates that the TSP is prepared to vouch for the trustworthiness of the principal. This means that it is exposed to risk if the principal defaults—it will lose reputation, and may also lose out materially if it is liable to some extent for the obligations of the principals it backs. In other words, the principal is trusting the judgement of the TSP as to the risk involved in dealing with the other parties.

A trust compact is said to be complete when the completion requirement 59 has been met. Typically this requires all parties 20, 21, 26, 27, . . . to the compact 5 to have added endorsements 509, 519, 529 . . . indicating consent. It is said to have failed if it can be concluded that it cannot be completed—typically this is because a party required to positively endorse the compact has negatively endorsed it.

"Consent" by a principal 20, 21, etc indicates that the principal is confident in engaging in a transaction involving the set of principals, providing the transaction is overseen by the set of TSPs acting in federation. "Consent" by a TSP indicates that it is confident of acting in federation with the other TSPs to ensure that the interests of the principals with which it is associated are upheld. Thus each principal relies on its respective TSP to approve or reject the proposed agreement, and each TSP relies on the other TSPs to approve or reject the principals with which they are respectively associated.

In this embodiment, all the agents have three functions, referred to hereinafter as "trust", "consent", and "complete":

The function trust (<party>, <compact>), is evaluated to decide whether the agent trusts another party in the current context. In general, the function returns one of three values, referred to here as "positive" "negative" and "conditional". The function returned depends on the user's previous experience with that other party. In order to perform this function, each user maintains stored lists of agents for which it can return a positive or negative trust value and, if required, the circumstances in which that value may be returned—for example only for transactions up to a predetermined financial limit. The conditional value is used e.g. if the party has insufficient experience of the other party to give a positive or negative response, and can be converted to a positive response if some other condition is met, typically the receipt of a positive response from another party.

For now (at least) we will assume that the value returned by trust is independent of the endorsements already attached to the compact when the agent receives it.

The function consent (<compact>), is evaluated by each party to determine whether the agent is prepared to endorse, or recommend endorsement of, the compact. It returns a recommendation for positive endorsement, negative endorsement or conditional endorsement. Conditional endorsement is appropriate if positive endorsement is conditional on some other factor, typically positive endorsement by some other party.

In one example, a TSP consents to a compact if:

it trusts (i.e. generates a positive trust value in respect of) all the TSPs in the compact, and it trusts all the principals with which it is associated (i.e. it is willing to represent them in this transaction), and it trusts all the principals not associated with any other TSP A principal will consent to a compact if:

it trusts all the principals in the compact, or it trusts a TSP with which it is associated.

Thus, if the principals have a history of co-operation with each other, the compact can be completed without any TSPs being involved. Alternatively, if the principals do not each have a trust record with each other, one or more TSPs, each associated with one or more of the principals, must be found that trust each other and collectively trust the principals Consent functions may be conditional, decisions by one agent depending on decisions by another, or on which agent the request was received from, e.g. a principal may consent only if its TSP has already consented, or a TSP may consent only if requested to do so by its principal.

In operation, one party requests another to consent to a trust compact. The trust compact (or a reference to it, such as an address from which it can be retrieved) is sent with the request. If the other party consents it adds a positive endorsement to the compact. If it does not consent, it normally adds a negative endorsement. In some circumstances, the consent decision may be deferred, in which case the trust compact is left unmodified, or a conditional endorsement added.

The complete (<compact>), function has three values: 'complete', 'failed' or 'incomplete'. This function is the same for all agents in a given system. In general, all parties to the compact (principals and TSPs) must have positively endorsed the compact for it to be "complete". Hence if one party has negatively endorsed it, the compact cannot be completed and has failed. If some endorsements have yet to be made, or are conditional, the compact is "incomplete".

Two procedures by which the trust compact may be completed will now be described with reference to FIGS. 6 and 7 respectively. In each case we suppose a candidate trust compact exists, with a set of principals, TSPs and associations, but no endorsements as yet. In order to complete the trust chain or to conclude that the chain cannot be completed, it is necessary to request consent from its required parties until either all have added positive endorsements, or until one has added a negative endorsement.

Figure 6:
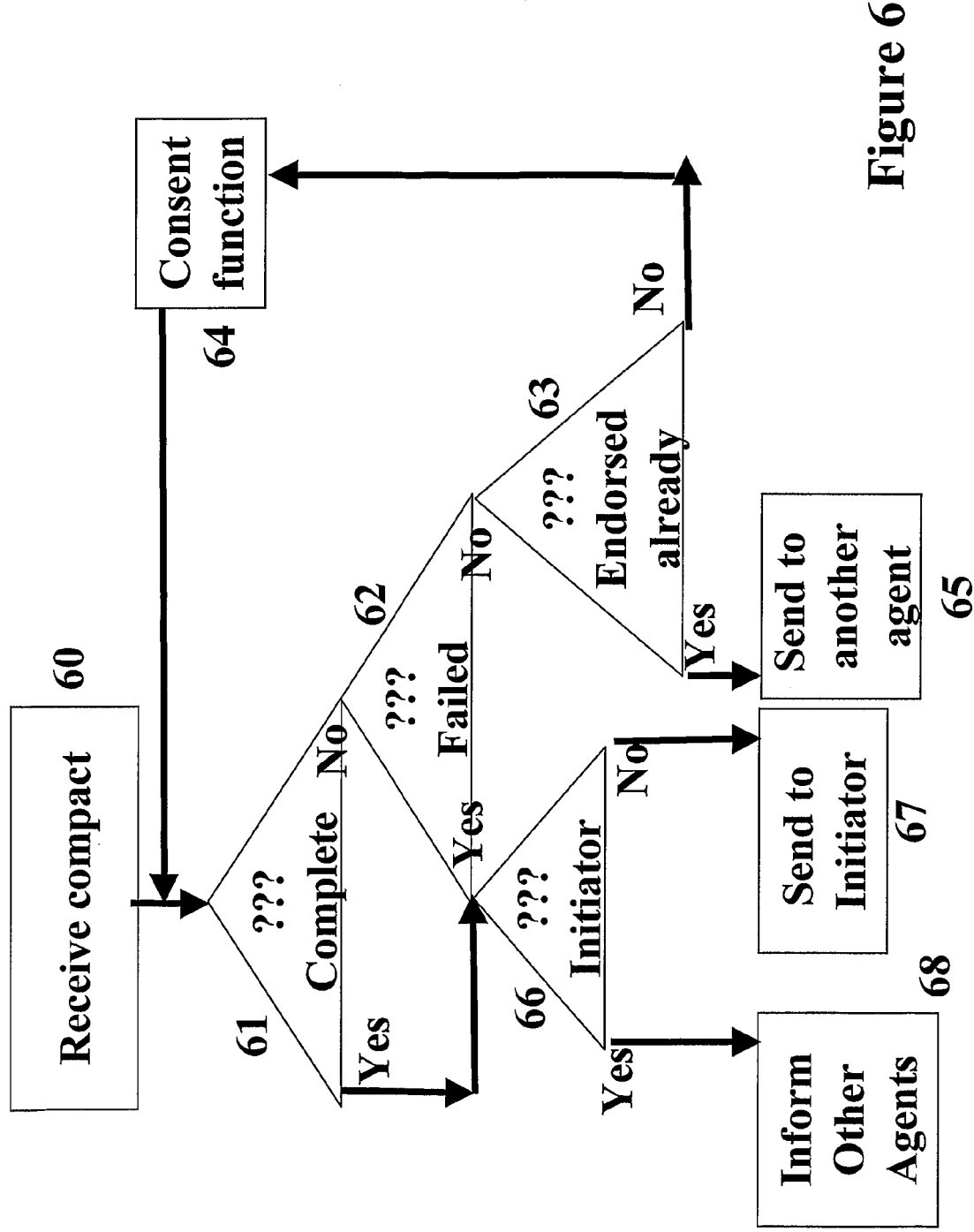
FIG. 6 is a flow diagram illustrating a first embodiment of the process performed by a device according to the invention.

FIG. 6 illustrates a simple procedure based on a 'one-way' protocol, which relies on all agents being capable of communication with all other agents, and that there are no constraints that restrict the order in which endorsements must be obtained. One agent is identified as the initiator and noted as such in the candidate compact 5. The compact 5 is sent first to the initiator. The agents modify the compact, and exchange it amongst themselves, as follows:

Any agent receiving the compact (step 60) examines the endorsements, tests for completion (step 61) and for failure (step 62), and then applies the following rules:

If the compact is incomplete (that is to say, neither complete nor failed), and the agent has not already endorsed it (test 63), the agent applies its consent function (step 64) and endorses the compact according to the result of the consent function. It then tests again for completion (step 61).

If the compact is incomplete, but has been endorsed by the agent currently holding it, one of the agents that has not yet endorsed it is selected, and the compact is sent on to that agent (step 65).

If, either when the agent first receives it (step 60), or as a result of its endorsement (step 64) the compact is found to be complete (test 61) or has failed (test 62), the compact is sent to the initiator (step 67). However, if the agent is itself the initiator (test 66), it sends messages to all agents who have endorsed the compact informing them of the result (step 68). The process is then ended.

This set of behaviours requires that each agent is able to communicate with all the others, other and that consent decisions can be made independently. The process will always terminate resulting in a 'complete' compact. It will terminate as soon as the compact is 'complete', and no agent will receive the compact more than once.

However, cases may arise when not all agents can communicate with each other, or when consent decisions made by one agent are conditional on responses made by others. We can qualify the behaviours by arranging that an agent will only attempt to send messages to agents with which it can communicate and, if possible, one that has not already endorsed the compact. If there is no agent available for communication that is consistent with the selection criteria in this rule, an available agent listed in the compact that is not compliant is sent the compact instead. However, the compact is not returned directly to the agent from which it was received unless no other agent is available, and an agent should not send the same compact to any given agent more than once unless endorsements relating to that agent have changed in the interim.

This additional behaviour will enable the process to complete in many cases. If the compact arrives back at the initiator incomplete, it will act as any other agent would, and try other agents accessible to it that have not endorsed the compact. If there are no such agents remaining, it will conclude that it is not possible to complete the compact, either because the communications network is incomplete or because one or more conditional responses cannot be resolved. If some properties of the interconnection topology are known (for example, if it is known that all ATSPs can communicate with all other ATSPs), this knowledge can be used to make the search more efficient.

Complications may also arise if there are constraints that make the ordering of endorsement decisions important. For example, a principal's endorsement decision may depend on additional information provided by its TSP as part of its endorsement. In this case the TSP must endorse before the principal can make a definite decision. The consent function can return a value indicating one or more pieces of information that need to be determined before it can reach a conclusion—in this case information added to the endorsement by another agent. To resolve this, if the consent function generated by a given agent 21 (FIG. 4) yields a result: 'undetermined due to lack of endorsement from Agent 29', the agent 21 forwards the unmodified compact to another agent 25. Later on, the compact will arrive at the dependant agent 29, which makes its decision. Eventually the first agent 21 will be consulted again because it has not yet endorsed the compact, and because the dependant agent 29 has now endorsed the compact, the other agent 21 can now also do so.

Alternatively, the Agent 21 may generate a conditional endorsement, e.g. indicating consent provided that another agent 29 also adds a positive endorsement, or a reciprocal conditional endorsement. An unmatched conditional endorsement is treated as a positive endorsement for 'routing' purposes. If the conditional endorsement is matched, it is treated as not present. Thus a conditional endorsement will be returned to the agent that issued it only after it has been matched. One advantage of the conditional endorsement approach is that the endorsement can carry information, e.g. to ask an agent a question to be answered in that agent's own endorsement. Conditional endorsements are also useful where connectivity is incomplete. They help ensure that agents are not re-visited until it is possible for them to make a definite decision.

Figure 4:
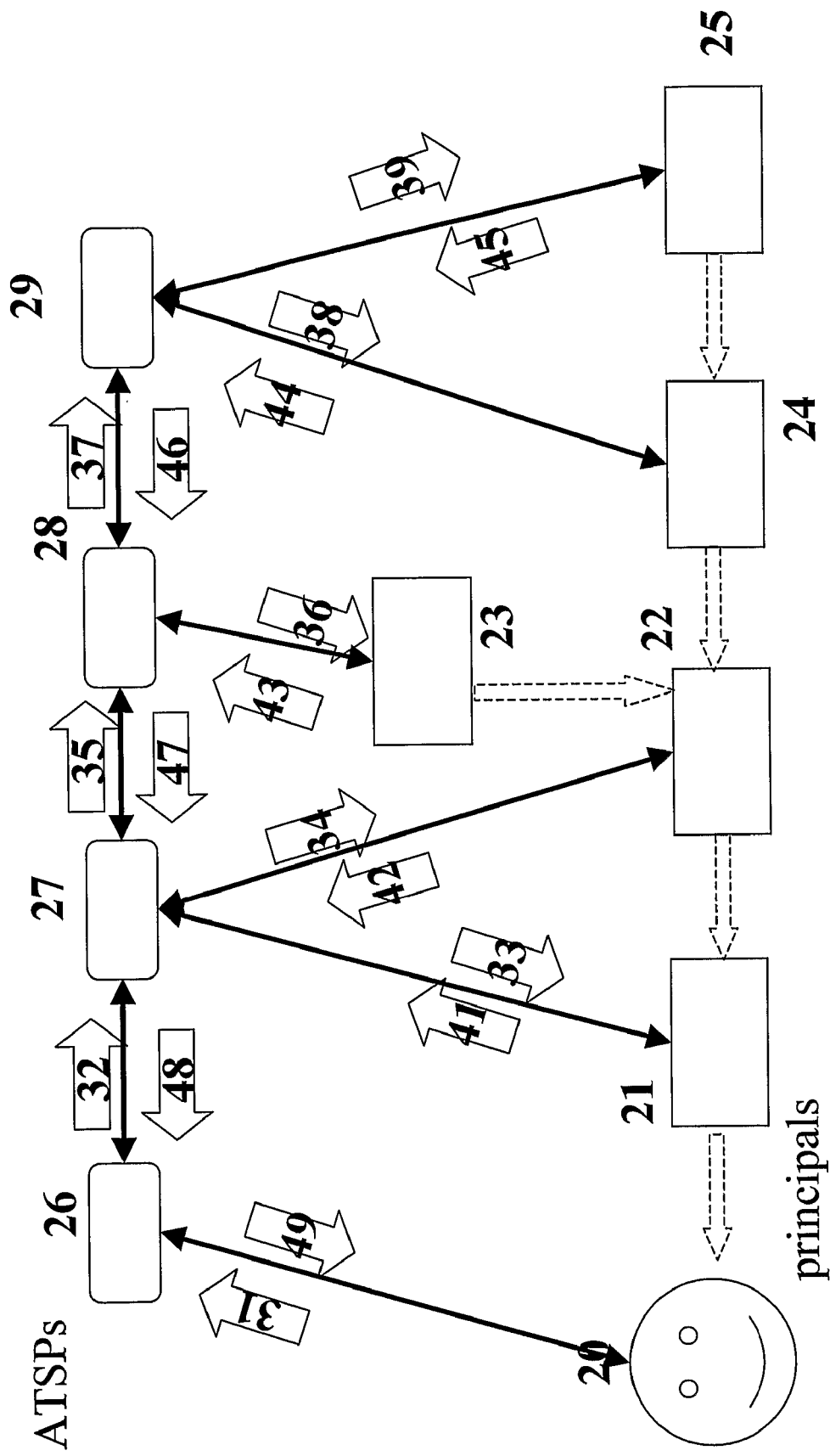
FIG. 4, which has been partially discussed, is a schematic diagram illustrating the relationships between six principals and four trust service providers, and the messages that may pass between them in one embodiment of the invention (the second embodiment to be discussed)
Figure 7:
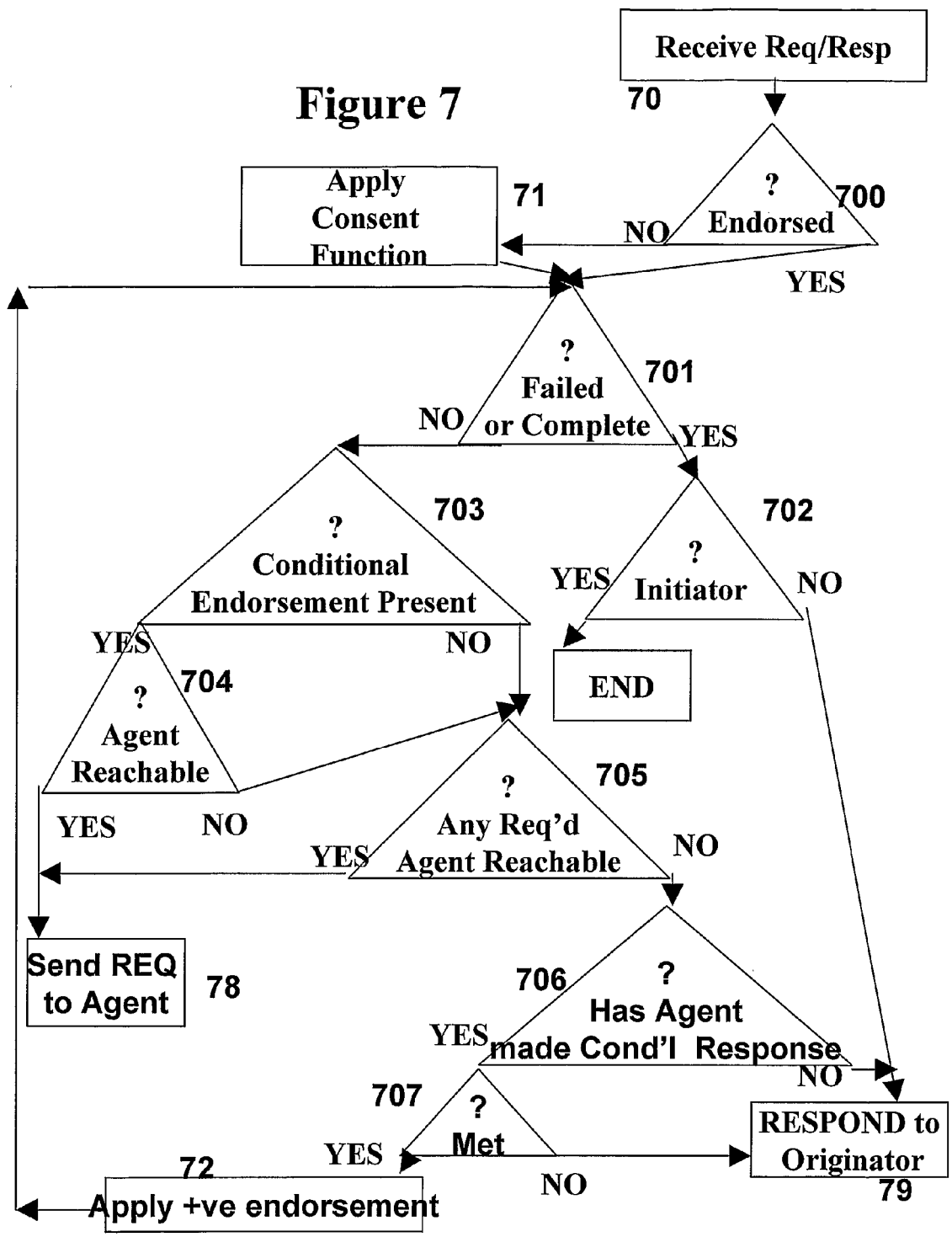
FIG. 7 is a flow diagram illustrating a second embodiment of the process performed by a device according to the invention.

Some of the routing problems discussed above in systems lacking universal connectivity and/or involving dependent decisions can be resolved by using an alternative, 'request-response', protocol, illustrated in FIG. 4 and FIG. 7. This protocol has two types of message: "request" and "response". Both message types carry a trust compact. The protocol uses conditional endorsements as suggested during the 'one-way' discussion. A conditional endorsement is said to be 'matched' if the positive endorsement on which it depends is present or if it is part of a reciprocal pair or more generally a ring of conditional endorsements (e.g. the 3-ring A is conditional on B, which is conditional on C, which is conditional on A). In the description of behaviours, a conditional endorsement is treated as a positive endorsement unless a matching or reciprocal endorsement is present, in which case it is treated as not present. The rules aim to replace matched conditional endorsements with positive endorsements to ensure eventual completion.

FIG. 4 shows the flow of request and response messages in an example situation where direct communication between principals is not possible. These are illustrated by the broad arrows in FIG. 4, the requests being referenced 31-39, and the responses 41-49. The solid double-headed arrows in FIG. 4 indicate associations between principals and ATSPs. In this case, these arrows also imply a mutual dependency regarding endorsement decisions. The particular message sequence shown is determined by the general rules of behaviour outlined below, the mutual dependencies, and the lack of communication between principals.

The process is as follows. It must be understood that the "initiator" is the agent 20 that begins the entire process, and the "originator" is the source of an individual request message within the process.

The request message is interpreted as a request for the addressee to consent to the compact (i.e. to add a positive endorsement). If the recipient consents, it returns a positive response containing the compact endorsed positively. If it does not consent, it returns a negative response. In this case, addition of a negative endorsement indicates definite dissatisfaction with the compact. Lack of an endorsement from the responding agent indicates neither definite consent nor dissatisfaction. A conditional endorsement is similar, except that it gives an indication of the conditions upon which the endorsement is dependent. As part of a mechanism for handling dependencies well in situations, a third type of response is introduced: 'conditional'. This mechanism will be explained below.

Note that an agent will not, in general, respond to such a request directly, but may hold a request whilst it sends its own requests and seeks responses thereto.

An agent receives a request or response (step 70). If it has not already endorsed the compact (test 700), it applies its consent function (71) and endorses the compact appropriately (positive, negative, or conditional) then behaves as follows.

If the agent is now holding a compact that has failed (test 701) it returns a negative response to the originator of the request. If it is holding a completed compact (test 701) it returns a positive response to the originating agent. If the agent is itself the initiator and it does not owe another agent a response, the process has normally completed. Therefore each agent receiving such a failed or completed response will pass it back in turn to the agent from which it received the corresponding request (step 79), until the responses reach the initiator 20. If the compact held by the agent has an unmatched conditional endorsement indicating a dependency on a decision by an agent (test 703), and if this agent is in communication with it (test 704), it sends a request to that agent (step 78) and awaits a response. Otherwise, if the agent is in communication with an agent whose endorsement is required to complete the compact (test 705), it sends a request to the agent (step 78) and awaits a response. If all agents with which the current agent can communicate have already endorsed the compact, it prepares a response to the original request. The form of this response is determined as follows:

If the compact already has a conditional endorsement from the agent itself (test 706) and a matching positive or reciprocal conditional endorsement, (test 707) it replaces its own conditional endorsement with a positive endorsement (step 72) and re-applies the tests above (test 701 etc).

This last condition causes matched conditional endorsements to be replaced by positive endorsements in situations where agents can communicate directly with other agents on whose decisions they are dependent. This is because all agents will be re-visited on the 'return path' once the last required agent has endorsed the compact. Note that a conditional endorsement can only be replaced by the agent that made it in the first place.

In some cases, for example due to conditional dependencies, the initiator may itself receive a request. The obligation that every request must have a corresponding response must be honoured, so in such circumstances, the process is incomplete (step 701) so the originator behaves as would any other agent (steps 703-706).

Where connectivity is incomplete, it is necessary to ensure that an agent that has placed a conditional endorsement will be revisited once the dependency has been resolved. To address this issue, a 're-consult' flag is used. This is similar to a conditional endorsement. If the compact contains a conditional endorsement from another agent a flag is applied identifying that agent, and the conditions under which the endorsement can be made positive (or negative) and indicates that the agent should be sent another request if the condition should become satisfied. Typically, the condition cites a conditional endorsement and becomes satisfied if the endorsement's condition is satisfied. Thus, if the agent is presented with a compact which has a "reconsult" flag that it has itself placed, and citing an agent with which it is in communication, and the condition is now satisfied, it removes the flag, and forwards a request to the agent identified therein (step 78).

Otherwise, the agent has exhausted all possibilities for further requests and returns a response to the originator (step 79). An agent returns a conditional response if its endorsement of the compact is conditional or if the compact contains any 'reconsult flags' it has itself added. The endorsement and/or the conditions of the reconsult flags are included as 'reasons'. On receipt of a conditional response, an agent adds a reconsult flag citing the agent sending the response and the associated conditional endorsement/conditions.

It will be seen that a request 31-39 always results in a corresponding reply 41-49. However the recipient may consult other agents before making a decision and returning a reply. In the simple case (complete connectivity, no decision dependencies) the request-response approach offers no advantages over the 'one-way' approach, and is less efficient (it requires more messages to be sent). The request-response approach can offer advantages in terms of reduced complexity of decision making and of agent state in the other cases. The set of behaviours described above implements a strategy that encompasses incomplete connectivity and dependent decisions. It is basically a 'depth first' strategy in that an agent will consult other agents if they are accessible before returning a response.

The architecture described above is designed to gain consent to a pre-existing candidate trust compact. Here we consider mechanisms by which the candidate trust compact can be established. Three basic alternatives are considered below.

In the first approach, there is a distinct compact-building phase, during which consultation takes place to establish a candidate compact that is likely to receive assent form all parties. The consultation process is similar to that involved in seeking consent. The main difference is that it is permissible for the parties to add TSPs to the compact in order to improve its acceptability to them. The underlying assumption is that it is unlikely that a party will actively distrust a TSP so that adding one to the compact will tend to increase the probability of consent. It is assumed that the principals are determined by the nature of the transaction, so that only varying the TSPs is considered. A party receiving a request either: adds a positive endorsement, or adds one or more TSPs as well as a positive endorsement, or adds a negative endorsement (causing the process to fail)

A possible refinement is to allow a party to propose a set of alternative TSPs. In this case subsequently consulted parties would be allowed to 'prune' some of the alternatives if they were not acceptable for some reason.

Once all parties have positively endorsed the compact in this building phase, the candidate is recirculated to gain explicit consent.

A second approach is an iterative or 'trial and error' approach. A 'minimal' candidate compact is devised by some means and circulated to gain consent. If this attempt is rejected by another party, that party may start a new attempt with additional TSPs (the minimal set that would make the chain acceptable to it), and so on. This process is facilitated by introducing the idea of a conditional rejection (a negative endorsement with additional information). This is a form of response indicating that the rejecting party will be sending out a counter-offer. Other parties considering making a revised request should therefore hold off doing so.

The above two approaches both distinguish clearly between two modes of operation: building the compact and gaining consent, leading to a certain amount of repetition. Repetition may be avoided by combining both building the compact and gaining consent in a single pass.

A refinement of this embodiment allows the TSPs in the chain to be specified indirectly initially. That is, rather than being specified explicitly, the TSP is described by a TSP expression. The expression is resolved to an actual TSP as part of the search procedure. An entity capable of resolving an expression to a TSP is known a TSP referrer. The particular situation of interest is that in which a principal's TSP is supplied as part of some aggregated service. The actual TSP is not known to the principal, but is nominated by the provider of the aggregated service. The TSP expression used has the meaning 'the TSP associated with principle P as notified by referrer R'. During the search procedure, the initiating party or a party receiving a request should try to resolve the expression by contacting the referrer. The referrer provides a signed assertion stating that the 'the TSP associated with principle P as notified by referrer R is T'. This assertion is attached to the trust compact.

Another related refinement is to allow a set of alternative TSPs to be given in place of specific TSP. In endorsing a chain containing such an expression, a party is say that a trust chain in which this set is replaced by any one of its members can also be regarded as endorsed. During the search, such a set may be replaced by a subset or a single element, with the new form still being accepted as valid. If the trust chain is completed with the set still not resolved to a single TSP, the initiating party chooses which one of the alternatives should be used.

What is claimed is:

1. A processing device for co-operation with one or more corresponding devices to control the progress of a transaction, means for receiving data files from other such devices, means for reading endorsements of the received data files applied by other parties, means for re-endorsing such data files in respect of each other party identified therein with a positive, negative, or conditional endorsement, wherein at least one of the endorsements in the received data files read by the means for reading endorsements is a conditional endorsement and this conditional endorsement in the received data files is converted to a positive endorsement if specified conditions are satisfied, means for identifying data files which have been endorsed by all parties identified therein, means for reporting a successful validation if all resulting endorsements are positive, and means for reporting an unsuccessful validation if any of the endorsements are negative, and means for progressing the transaction is the validation is successful, and transmission means for transmitting the data file to devices associated with other parties identified therein.

2. A processing device according to claim 1, further comprising means for identifying all the parties to a proposed transaction, means for creating a trust data file which identifies all the parties to the transaction, and means for transmitting the file to one or more of said parties.

3. A processing device according to claim 1, provided with means for generating and transmitting an endorsement that is conditional on a response from another device, and means for modifying the endorsement on subsequently receiving a data file with such endorsement from the other device.

4. A computer readable storage medium tangibly storing a computer program or suite of computer programs which are executed by one or more computers to provide the apparatus as set out in claim 1.

5. A computer readable storage medium tangibly storing a computer program according to claim 4, comprising general instructions which are executed by a processing device to process a data file received from another such device.

6. A computer readable storage medium tangibly storing a computer program according to claim 4, wherein the instructions include the instructions which are executed. by the one or more computers for generating a data file, including identifying the agents to that are required to endorse the file.

7. A computer readable storage medium tangibly storing a computer program according to claim 6, comprising the said data file, the file comprising instructions which are executed by the one or more computers to cause a receiving device to process the data embodied in the data file according to general instructions previously programmed into the receiving device.

8. A computer implemented pre-validation process for transactions between two or more agents, the process comprising:
 using at least one computer processor to perform:
  creating a data file which identifies all the agents which are to take part in the transaction,
  circulating the data file to all the agents, and endorsing, by each agent, the data file in respect of each other agent with a positive, negative, or conditional endorsement, and at least one of the endorsements is a conditional endorsement, wherein:

a conditional endorsement between a first agent and a second agent is converted to a positive endorsement if the conditions expressed within it are satisfied, and when all agents have endorsed the data file a successful validation is reported if all resulting endorsements are positive, and an unsuccessful validation is reported if any of the endorsements are negative.

9. A method according to claim 8, wherein the conditional endorsements are expressed in terms of the presence or absence of other endorsements in the data file.

10. A method according to claim 9, wherein each agent returns a response to the agent from which it received the data file, either immediately or after having in turn forwarded the data file to another agent and having received a response therefrom.

11. A method according to claim 10, wherein an agent making an endorsement conditional on an endorsement by another agent forwards the endorsed data file to be received by the other agent and awaits a response, and modifies its endorsement upon receiving a response carrying the data file endorsed by the other agent.

12. A method according to claim 8, wherein each agent, having endorsed the data file, forwards it to another agent that has not yet unconditionally endorsed the data file, or if no such agents remain, to the agent from which the file originated.

13. A computer readable medium tangibly storing a computer program comprising a set of instructions, which upon execution by a computer system, causes the computer system to perform a pre-validation process for transactions between two or more agents, the process comprising:

creating a data file which identifies all the agents which are to take part in the transaction, circulating the data file to all the agents, endorsing, by each agent, the data file in respect of each other agent with one of a positive, negative, and conditional endorsement, and at least one of the endorsements is a conditional endorsement, and converting a conditional endorsement between a first agent and a second agent to a positive endorsement if the conditions expressed within it are satisfied, wherein when all agents have endorsed the data file a successful validation is reported if all resulting endorsements are positive, and an unsuccessful validation is reported if any of the endorsements are negative.

* * * * *